United States Patent [19]
Thomas et al.

[11] Patent Number: 5,352,918
[45] Date of Patent: Oct. 4, 1994

[54] CAPACITATIVE MICRO-SENSOR WITH A LOW STRAY CAPACITY AND MANUFACTURING METHOD

[75] Inventors: Isabelle Thomas; Pierre O. Lefort; Christophe Legoux, all of Valence, France

[73] Assignee: Sextant Avionique, Cedex, France

[21] Appl. No.: 20,077

[22] Filed: Feb. 19, 1993

[30] Foreign Application Priority Data

Feb. 20, 1992 [FR] France .................. 92 02191

[51] Int. Cl.$^5$ .................. H01L 29/84; H01L 29/96
[52] U.S. Cl. .................. 257/417; 257/535; 73/517 AV
[58] Field of Search .......... 257/254, 417, 418, 419, 257/420, 532, 535; 73/517 AV; 361/280

[56] References Cited
U.S. PATENT DOCUMENTS

4,930,042 11/1990 Wiegand et al. .......... 73/517 AV

FOREIGN PATENT DOCUMENTS

0369352 5/1990 European Pat. Off. .

*Primary Examiner*—Sara W. Crane
*Attorney, Agent, or Firm*—Lowe, Price, LeBlanc & Becker

[57] ABSTRACT

A capacitive micro-sensor includes a sandwich of three silicon plates, each surface of the frame region of the central plate being assembled to the opposing surface of each external plate through a thin layer forming an insulating stripe. At least one of the external plates forms a first electrode, and at least one central portion of the central plate forms a variable capacity with at least one of the external plates. The frame region of the central plate is electrically disconnected from the central portion. First contact means are coupled to the frame portion. Second contact means are coupled to the central portion and form a second electrode of the variable capacity.

5 Claims, 3 Drawing Sheets

CAPACITATIVE MICRO-SENSOR WITH A LOW STRAY CAPACITY AND MANUFACTURING METHOD

BACKGROUND OF THE INVENTION

1. Field of the Invention

The present invention relates to silicon capacitive micro-sensors. Such micro-sensors are, for example, pressure sensors, acceleration sensors, and so forth.

2. Discussion of the Related Art

Over the last years, new silicon micro-sensors have been developed, taking advantage of the silicon etching techniques developed for the manufacturing of semiconductor electronic components. Initially, such micro-sensors were formed by the combination of suitably etched silicon plates and thin glass plates serving as airtight chamber or as separating insulating plates inserted between the silicon plates, these glass plates bearing various metal electrode patterns.

Nowadays, the trend is to develop micro-sensors entirely made of silicon, without any glass plate having an active function. Schematic examples of such sensors are shown in FIGS. 1 and 2.

FIG. 1 shows an acceleration sensor; FIG. 2 shows a pressure sensor. Each of these sensors includes a central silicon plate 1 sandwiched between the external silicon plates 2 and 3. Insulation between the plates is ensured by a first insulating stripe, usually a silicon oxide layer, 5, between plates 1 and 2, and a second insulating stripe, 6, between plates 1 and 3. Such frame insulating stripes are disposed between adjacent plates, along the edges of the latter. Oxide layers are grown or deposited on one of the adjacent plates. Once the three plates are assembled, welding is carried out by annealing at a temperature within the range of 900° to 1100° C. To achieve this purpose, experiment shows that the silicon and silicon oxide surfaces facing each other must have a very slight roughness, for example lower than 0.5 nm. The external silicon plates 2 and 3 define between themselves and with the frame portion of the silicon plate 1 a region in which a controlled atmosphere is contained, such as an atmosphere below atmospheric pressure, referred to as a vacuum.

The above description commonly applies to the micro-sensors of FIGS. 1 and 2.

In the example of FIG. 1, which is a schematic cross-sectional view of an accelerometer, the central silicon plate 1 is etched before being assembled in order to include a frame and a central plate or inertia block 8 fixed to the frame by thin suspension rods 9. A single rod is shown in the schematic cross-sectional drawing of FIG. 1. Conventionally, two-rod or four-rod suspension systems are used. The external plates 1 and 3 delineate a vacuum cavity with the frame formed at the periphery of the central plate. The capacitance variations between the upper surface of the inertia block and the silicon plate 3 are detected and also, if required, between the lower surface of the inertia block and the lower plate 2. When the device is subject to acceleration, inertia block 8 moves with respect to the whole device, causing the above-mentioned capacities to vary. Additionally, an electrostatic control is generally provided in order to maintain the inertia block in place by applying a d.c. electric field; it is then the error signal which indicates the capacity variation.

FIG. 2 schematically shows a structure forming a pressure sensor. The lower plate 2 is etched in order to form a thin diaphragm 11. Plate 1 is etched to form a stud 12 contacting the diaphragm. A silicon strip 13 extends between stud 12 and the frame of plate 1. Again, the area delineated by the upper plate, the lower plate and the frame of the central plate defines a vacuum cavity. Variations of the external pressure deform diaphragm 11 and create stresses in strip 13. This stress variation causes variation of the resonance frequency of the capacitive resonator formed by strip 13 (vibrating beam) and the opposing surface of plate 3. Preferably, the internal side of plate 3 is etched in order to form a protruding stripe facing strip 13.

In the example of FIG. 1, electrodes 21, 22 and 23 must be coupled to plates 1, 2 and 3, respectively. In the example of FIG. 2, only electrodes 21 and 23 are required.

The drawback of these prior art structures, directly measuring either a capacity or a resonance frequency, is that measurements are substantially impaired by the presence of high stray capacities. Such stray capacities mainly correspond to the capacities between the frame formed in plate 1 and the opposed portions of the upper and/or lower plate, the dielectric of these capacities being formed by the silicon oxide insulating layers 5 and 6.

SUMMARY OF THE INVENTION

An object of the invention is to provide a micro-sensor structure avoiding the detrimental effect of these stray capacities.

To achieve this object, the invention provides a capacitive micro-sensor including a sandwich of three silicon plates. Each side of a frame region of the central plate is assembled to the opposing surface of each external plate through a thin layer forming an insulating stripe. At least one of the external plates forms a first electrode, and at least one central portion of the central plate forms a variable capacity with at least one of the external plates. The frame region of the central plate is electrically disconnected from the central portion. First contact means are coupled to the frame portion, and second contact means are coupled to the central portion and form a second electrode of the variable capacity.

When the capacitive micro-sensor forms an accelerometer, the central portion of the central plate forms an inertia block suspended to a stud sandwiched between the external plates through the insulating layers.

When the capacitive micro-sensor forms a pressure sensor, the lower plate includes a thinner portion forming a diaphragm. The central portion of the central plate includes a first stud mounted onto the diaphragm, and a stripe extending between the first stud, and a second stud mounted between the external plates through the insulating layers. The stripe forms with the upper plate a capacitive resonator whose characteristics vary as a function of the applied pressure.

According to an embodiment of the invention, the frame region is set (possibly in a floating way) to the reference voltage of the central plate.

According to an embodiment of the invention, the insulating layers are of silicon oxide.

The invention also provides a method for manufacturing a capacitive micro-sensor comprising the steps of etching the central plate in order to form a frame and a central portion including a stud and a sensitive region, leaving thin connecting strips between the frame and the central portion, the upper sides of the frame, of the pad and of the sensitive portion being plated with an oxide layer; forming on one side of one of the external plates facing the central plate, oxide layers facing the frame and stud regions; assembling and welding the central plate onto the external plate; carrying out predetermined etching for eliminating the connecting strips so as to provide the desired thicknesses in the sensitive region; treating a second external plate including oxide layers disposed in front of the frame and stud regions, and assembling the second external plate to the central plate; and carrying out the appropriate metallization steps.

The foregoing and other objects, features, aspects and advantages of the invention will become apparent from the following detailed description of the present invention when taken in conjunction with the accompanying drawings.

In the various drawings, the relative thicknesses of the various layers and the lateral sizes of the various elements are not to scale but are arbitrarily drawn in order to facilitate the legibility of the drawings.

Also, in the various figures, the lateral surfaces of the various silicon plates are shown as being obliquely etched since it is the aspect of these lateral surfaces once silicon anisotropic etching along planes (1, 1, 1) has been carried out. However, it will be noted, on the one hand, that this particular aspect of the present invention is not intended as limiting and, on the other hand, that the angle shown on the drawings is arbitrary. An exemplary real angle would be approximately 55°.

Figure 1:
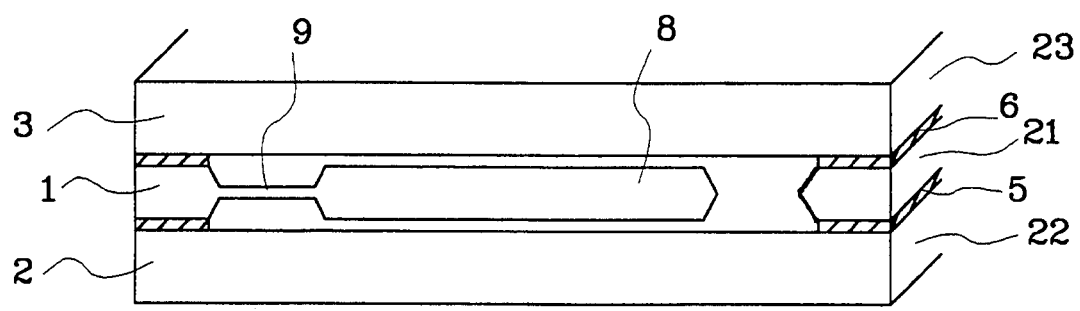
FIGS. 1 and 2, above described, are schematic cross-sectional views of an acceleration micro-sensor and a pressure micro-sensor of the prior art.

The following description of preferred embodiments of the invention is made in relation with an acceleration micro-sensor structure corresponding to the structure of FIG. 1. However, the invention generally applies to other types of micro-sensors formed by the assembly of several silicon plates.

DETAILED DESCRIPTION

Figure 3:
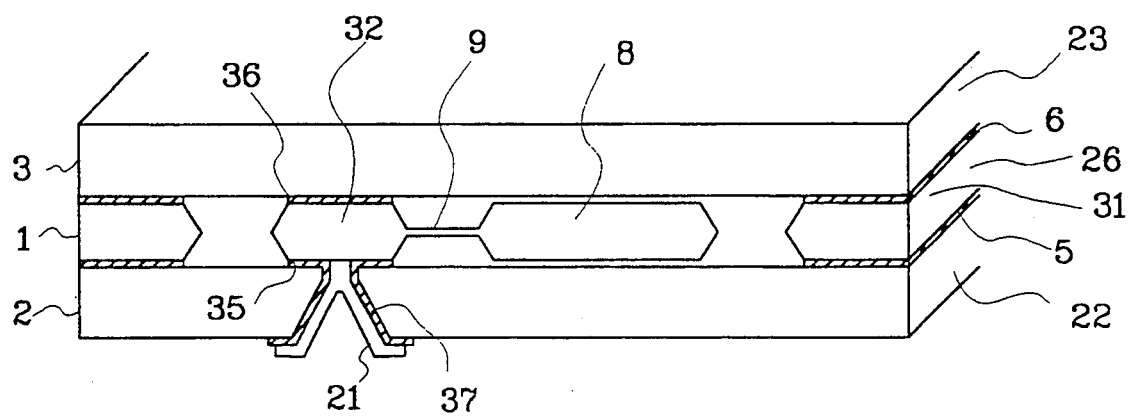
FIG. 3 is a cross-sectional view of an embodiment of an acceleration micro-sensor according to the invention.

FIG. 3 is a schematic cross-sectional view of an acceleration micro-sensor modified according to the invention. In FIG. 3, elements analogous to the elements of FIG. 1 are designated with the same reference numerals. The main difference between the structure according to the invention and the structure of FIG. 1 is that the portion forming the frame of plate 1 is entirely electrically disconnected from the active portion. Thus, plate 1 is divided into a frame 31 intended for separating the external plates 2 and 3 and delineating an internal vacuum cavity, and a portion 32 coupled to the active portion. In the cross-sectional view of FIG. 3, portion 32 is connected to the external plates through silicon oxide layers 35 and 36 corresponding to the silicon oxide layers 5 and 6 insulating the frame 31 from the external plates 2 and 3.

In the cross-sectional view of FIG. 3, the silicon portion 32 is represented as a stud connected to the inertia block by a single suspension rod 9. As described above, in practical devices, two-rod of four-case suspension systems are more generally used. In the case of a two-rod connection, the silicon portion 32 corresponds to an elongated stripe and, in the case of a four-rod connection system, the silicon portion 32 corresponds to an internal frame, or to four studs, surrounding inertia block 8. However, portion 32 will be referred to hereinafter as "stud" and this term is to be construed as designating a stud, a stripe or an internal frame.

As conventional, connections 22 and 23 are formed on the external silicon plates. Connection 21, intended to establish an electric contact with the inertia block, is taken through stud 32, for example, as shown in the drawing, by providing an aperture in the lower plate. The aperture walls are coated with an insulating layer 37; contact 21 is formed by a metallization contacting stud 32.

Figure 4:
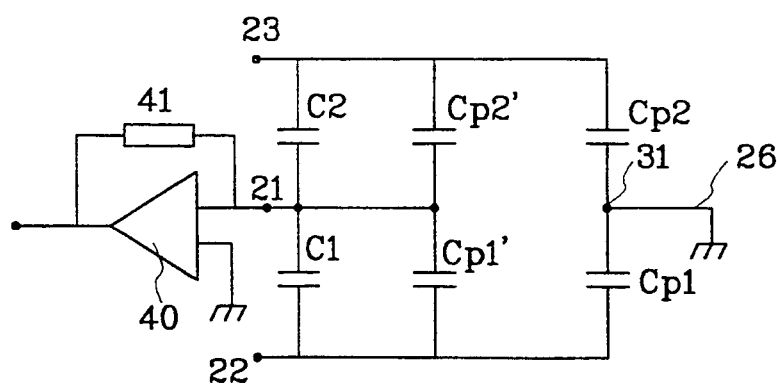
FIG. 4 is an electric diagram showing out advantages of the invention.

The advantage of the provision of the external frame 31 appears from the electric diagram of FIG. 4. FIG. 4 shows again terminals 21, 22 and 23. Capacitor C1 corresponds to the capacity between plate 2 and inertia block 8. Capacitor C2 corresponds to the capacity between plate 3 and the inertia block 8. The stray capacity between the lower plate 2 and the central plate 1 mainly corresponds to a stray capacity Cp1 disposed between terminal 22 and a terminal 26 connected to frame 31. Similarly, the stray capacity between plates 1 and 3 mainly corresponds to a stray capacity Cp2 disposed between terminals 23 and 26.

The left-hand portion of FIG. 4 shows the conventional input stage of a capacitance measuring system including an operational amplifier 40 whose output is fed back to the first input through an impedance 41. The first input of the operational amplifier is connected to terminal 21 and the second input to a reference voltage, such as ground. Thus, terminal 21 is at a floating voltage corresponding to the reference voltage. In most cases, d.c. and a.c. voltages are symmetrically applied to terminals 22 and 23. When terminal 26 is connected to the same reference voltage as the second input of amplifier 40, for example ground, the stray capacities Cp1 and Cp2 will no longer affect measurement whatsoever.

For the sake of exactness, the drawing of FIG. 4 also shows capacities Cp1' and Cp2', in parallel with capacities C1 and C2, corresponding to the other stray capacities of the system, for example the capacities between stud 32 and the external plates. In practice, the stray capacities Cp1' and Cp2' are very low, unlike in the prior art case where they include the capacities Cp1 and Cp2 of the sealing frame and where they have a detrimental effect on the measurement of C1 and C2.

Another advantage of the elimination of the influence of capacities Cp1 and Cp2 associated with the frame area is that these capacities are variable, more particularly as a function of the external peripheral aspect of the component. For example, if the external periphery of layers 5 and 6 are damp, this tends to increase the values of the associated stray capacities. Therefore, it is essential that their influence, liable to vary, be eliminated.

Figure 5A:
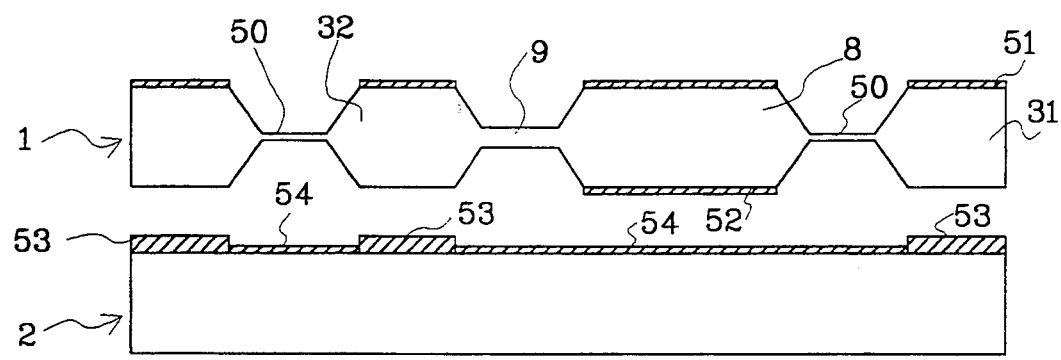
FIGS. 5A and 5B schematically show successive manufacturing steps of a sensor according to an embodiment of the invention.
Figure 5B:
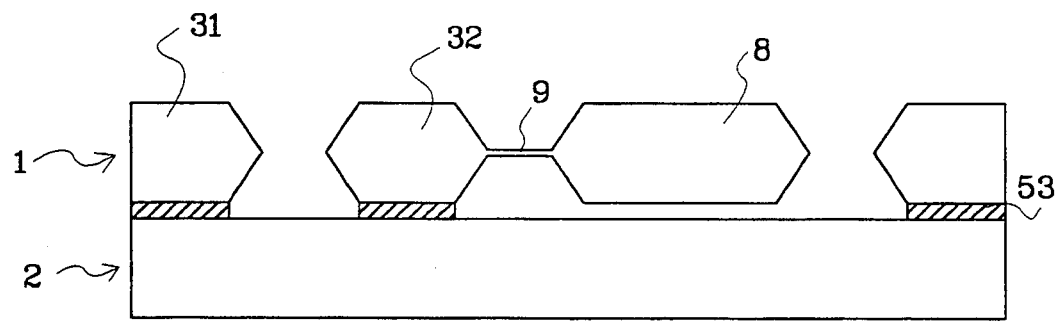

FIGS. 5A and 5B exemplify two possible steps for manufacturing a device according to the invention.

FIG. 5A shows, facing each other, the central plate 1 and an external plate, in the present case the lower plate 2. The central plate 1 has been previously etched in order to form the frame region 31, the stud region (or internal frame region) 32, and the inertia block region 8. At this step, there remains between the frame and the central portion, connecting strips 50 having a smaller thickness than the areas intended to form the suspension rods 9 which, at this step, are thicker than the end desired thickness. The upper surfaces of the frame, stud and inertia block regions are coated with a silicon oxide layer, such as thermal oxide 51, which served as a mask during the previous etching steps. Preferably, the lower surface of plate 1 is not coated with oxide except for a thin layer on the lower surface of inertia block 8.

The surface of the external plate 2 in front of the central plate 1 is treated to include thick oxide layers 53 facing the frame region 31, the stud region 32 and thin oxide layers in the other regions. The thin oxide regions can be obtained through etching and masking of the thick oxide layer regions. It will be noted that the thin oxide layer 54 together with the thin oxide layer 52 on the lower side of the inertia block 8 are thinner than layer 53.

Then, as shown in FIG. 5B, the central plate i is assembled with the lower plate 2 so that frame 31 and stud 32 contact the oxide layers 53 of the lower plate. To obtain a silicon/silicon oxide welding, heat treatment is carried out at a temperature within the range of approximately 900°-1000° C. Silicon is selectively etched in order to eliminate the connecting strips 50 and to give suspension rods 9 the desired thickness. Then, silicon is etched to eliminate the thin oxide layers 51, 52 and 54. During this step, the thick oxide layers 53 may be slightly laterally etched; however, this does not affect the device operation. The insulated aperture to access stud 32 is not shown in FIG. 5B.

After the step of FIG. 5B, the upper plate 3 is deposited on top of plate 1. Plate 3 is provided with an oxide frame corresponding to frame 53, in front of the stud region 32 and frame region 31.

The method of manufacture described in relation with FIGS. 5A and 5B is intended as an exemplary possible embodiment of the invention. A remarkable feature is that the central plate and one external plate have been previously welded in order to eliminate the connecting strips, which allows to treat the central plate 1 as a bulk element before eliminating the connecting strips. Other etching methods and various variants will clearly appear to those skilled in the art. For example, regions oriented toward the inner portion of the external plates in non-contact areas can be overetched in order to further limit stray capacities.

As is apparent to those skilled in the art, various modifications can be made to the above disclosed preferred embodiments. For example, once the three plates are assembled, the external surface of the external plates can be oxidized and plated with a metal layer forming a shield, and can be grounded to protect the device against parasitic overvoltages. Additionally, methods for manufacturing a specific type of a micro-sensor have been illustrated; it should be noted that the invention generally applies to various micro-sensors of the capacitive or resonance-type in which it is desired to eliminate the influence of the stray capacities associated with the outline of the internal cavity of the sensor.

Figure 2:
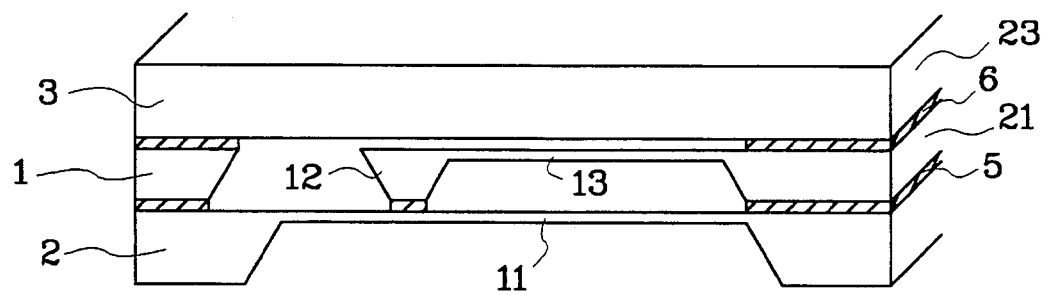

More particularly, the invention can apply to a structure as the one schematically shown in FIG. 2, in which, the vibrating beam 13, instead of being disposed between a stud and the external frame is disposed between two studs, the second stud being mounted on a thick area of the lower plate 2.

The manufacturing of a micro-sensor according to the invention has been schematically described and represented. In practice, it will clearly appear to those skilled in the art that this manufacturing results from a collective process, each plate being initially part of a silicon wafer, the separation into individual sensors being made after the end assembling operations and, if required, after the contact operations.

It has been indicated above that the internal portion of the sensor is an area below atmospheric pressure. In order to obtain this vacuum, those skilled in the art can use various methods. For example, the plates can be assembled in a vacuum chamber, or pumping can be achieved once the plates have been assembled. Also, the plates can be filled with a gas such as oxygen which is capable of being absorbed, through annealing, by the silicon.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

We claim:

1. A capacitive micro-sensor including a sandwich of three silicon plates (1,2,3), each surface of the frame region (31) of the central plate being assembled to the opposing surface of each external plate through a thin layer forming an insulating stripe (5,6), at least one of the external plates forming a first electrode (22,23), and at least one central portion of said central plate forming a variable capacity with at least one of said external plates, wherein the frame region of said central plate is electrically disconnected from said central portion, first contact means (26) being coupled to the frame portion, and second contact means (21) being coupled to said central portion and forming a second electrode of said variable capacity.

2. The capacitive micro-sensor of claim 1 forming an accelerometer, wherein said central portion of the central plate forms an inertia block (8) suspended to a stud (32) sandwiched between said external plates through the insulating layers (35,36).

3. The capacitive micro-sensor of claim 1 forming a pressure sensor, wherein the lower plate includes a thinner portion (11) forming a diaphragm, and the central portion of said central plate includes a first stud (12) mounted onto said diaphragm, and a stripe extending between said first stud and a second stud mounted between said external plates through the insulating layers, the stripe forming with the upper plate a capacitive resonator whose characteristics vary as a function of the applied pressure.

4. The capacitive micro-sensor of claim 1, wherein said frame region is set (possibly in a floating manner) to the reference voltage of said central plate.

5. The capacitive micro-sensor of claim 1, wherein said insulating layers are of silicon oxide.

* * * * *

UNITED STATES PATENT AND TRADEMARK OFFICE
CERTIFICATE OF CORRECTION

PATENT NO. : 5,352,918
DATED : October 4, 1994
INVENTOR(S) : Isabelle THOMAS et al.

It is certified that error appears in the above-indentified patent and that said Letters Patent is hereby corrected as shown below:

On the title page, delete item [54] and insert the following therefor:

CAPACITIVE MICRO-SENSOR WITH A LOW STRAY CAPACITY AND MANUFACTURING METHOD--.

Signed and Sealed this

Thirty-first Day of January, 1995

Attest:

BRUCE LEHMAN

*Attesting Officer*    *Commissioner of Patents and Trademarks*